(12) United States Patent
Zhu et al.

(10) Patent No.: US 8,765,865 B2
(45) Date of Patent: Jul. 1, 2014

(54) HEAT RESISTANT POLYLACTIC ACID COMPOSITIONS

(75) Inventors: Shixiong Zhu, Westlake, OH (US);
Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 141 days.

(21) Appl. No.: 13/502,355

(22) PCT Filed: Sep. 27, 2010

(86) PCT No.: PCT/US2010/050432
§ 371 (c)(1),
(2), (4) Date: Apr. 16, 2012

(87) PCT Pub. No.: WO2011/049714
PCT Pub. Date: Apr. 28, 2011

(65) Prior Publication Data
US 2012/0208947 A1    Aug. 16, 2012

Related U.S. Application Data

(60) Provisional application No. 61/252,905, filed on Oct. 19, 2009.

(51) Int. Cl.
*C09B 67/00* (2006.01)
*C08L 37/00* (2006.01)
(52) U.S. Cl.
USPC ............................................ 524/502; 524/517
(58) Field of Classification Search
USPC ........................................................ 524/502
See application file for complete search history.

(56) References Cited

U.S. PATENT DOCUMENTS

| 5,300,576 A | 4/1994 | Nemphos et al. |
| 6,605,681 B1 | 8/2003 | Villalobos et al. |
| 6,984,694 B2 | 1/2006 | Blasius, Jr. et al. |
| 2008/0153940 A1 * | 6/2008 | Scheer et al. ................. 523/124 |
| 2008/0262151 A1 | 10/2008 | Ishii et al. |
| 2011/0034607 A1 * | 2/2011 | Zhu et al. ...................... 524/425 |
| 2012/0220711 A1 | 8/2012 | Zhu et al. |

FOREIGN PATENT DOCUMENTS

| JP | 2008106091 A | 5/2008 |
| JP | 2008222987 A | 9/2008 |

OTHER PUBLICATIONS

EspaceNet Abstract of JP2008106091.
EspaceNet Abstract of JP2008222987.
Sokolowski et al., "Joncryl ADR Chain Extenders" (Jul. 24, 2009).
NatureWorks, "Technology Focus Report: Blends of PLA with Other Thermoplastics" (2007).

* cited by examiner

*Primary Examiner* — Hui Chin
(74) *Attorney, Agent, or Firm* — John H. Hornickel; Maria M. Hoke

(57) ABSTRACT

A significant disadvantage of the use of polylactic acid (PLA) has been overcome by the use of styrene maleic anhydride copolymer in combination with an epoxy functional styrene-acrylate oligomeric chain extender. The composition also often exceeds a threshold of 65° C. in heat deflection temperature.

17 Claims, 2 Drawing Sheets

HEAT RESISTANT POLYLACTIC ACID COMPOSITIONS

CLAIM OF PRIORITY

This application claims priority from U.S. Provisional Patent Application Ser. No. 61/252,905 filed on Oct. 19, 2009, which is incorporated by reference.

FIELD OF THE INVENTION

This invention relates to new compositions including polylactic acid and having increased heat resistance to improve structural integrity of the polylactic acid containing composition during use.

BACKGROUND OF THE INVENTION

Plastic articles have replaced glass, metal, and wood articles because plastic can be engineered to not shatter, rust, or rot. The durability of plastic articles also creates a disposal dilemma. Also, many plastic resins are made from petrochemicals, which have long-term supply and cost issues.

Therefore, there is a considerable effort underway to find biologically-derived and sustainable sources of thermoplastic resins, preferably those which degrade or compost to also resolve the disposal dilemma.

Polylactic acid, also known as polylactide or PLA, has been explored as a thermoplastic resin from biologically sustainable origins which can replace petrochemically originated resins.

SUMMARY OF THE INVENTION

While polylactic acid is probably one of the three most popular bio-derived resins being explored, it has the distinct disadvantage, as when compared to the fossil-derived resins it is meant to replace, in that it has a poor heat deflection temperature.

Heat deflection temperature (HDT) is a measurement of deflection of a sample under flexural load using the protocol of ASTM D648. The flexural load can be either of two settings. For purposes of this invention, 66 pounds per square inch (psi) or 455 kilo-Pascals (kPa) will be used for comparative measurements of heat deflection.

The problem with polylactic acid is that it has a heat deflection temperature under a 455 kPa flexural load of about 55° C. or 131° F. In other words, inside a automobile on an Arizona summer day, PLA would not be sturdy enough to be used as a thermoplastic resin molded into a passenger compartment component, as the case for an electronic handheld device laying on the seat, or as a piece of packaging containing perishable food in a grocery bag on the floor inside the automobile.

The problem with PLA is that it does not have sufficient heat resistance to allow it to be considered as a practical replacement for fossil-derived thermoplastic resins now used in many common plastic articles.

The present invention solves that problem by reacting PLA with an oligomeric chain extender and a styrene-maleic anhydride copolymer (SMAC) to form a new polymer which has increased heat resistance, compared with PLA, so that the new composition can be used ubiquitously.

The art has had a long-felt need for solving this heat resistance problem. Published literature of NatureWorks, LLC, a principal manufacturer of PLA reports that adding as much as 50% by weight of polymethyl methacrylate (PMMA) to PLA to create a 50/50 PLA-PMMA composition improves HDT by as little as 4° C. over the HDT of pure PLA polymer resin (63° C. vs. 59° C.).

Moreover, the art has had a long-felt need for solving this heat resistance problem, and it has been commonly characterized in some industries that a PLA composition should preferably have at least a 65° C. HDT at 66 psi to be a practical thermoplastic composition of both biologically sustainable origin and practical commercial use. At long last, the present invention has discovered also suitable combinations of reactants to achieve, and exceed, that goal of 65° C. at 66 psi.

The art needs a means to increase the actual HDT values for PLA, while also retaining the resulting composition preferably as principally significantly a PLA composition.

For purposes of this invention, it is preferred that the PLA remain the "significant component", meaning that PLA is present in at least about thirty weight percent (30%) of the composition.

For some situations when it is desirable to market plastic articles made from the composition as made principally from bio-renewable materials, the PLA can be present as the "principal component", meaning that it has the highest or equal to highest weight percent of the composition among all ingredients employed. For example, PLA will be the "principal component" in a two-ingredient composition if it has 50% or more weight percent of the total composition. PLA will also be the "principal component" in a three-or-more-ingredient composition if it has a plurality weight percent in excess of any other ingredient, e.g., 34% PLA in a composition with two other ingredients each having 33 weight percent. PLA is also the "principal component" for this invention if its weight percent is equal to the weight percent of one other ingredient, such as in a 30 (PLA)-30-20-20 (other ingredients) in a four-ingredient composition.

It has been found, unexpectedly, that the combination of an oligomeric chain extender and styrene maleic anhydride copolymer can increase the HDT of a PLA composition by at least 5° C. more than the HDT for PLA alone. A new polymer reacted from PLA, oligomeric chain extender, and the SMAC can also preferably have a HDT of more than 65° C.

One aspect of the present invention is a heat resistant polylactic acid composition, comprising (a) polylactic acid and (b) styrene maleic anhydride copolymer; wherein polylactic acid and styrene maleic anhydride copolymer have a weight ratio of 2.3:1.0 or less; and wherein if the composition is essentially dried before shaping into a plastic article, then the composition after shaping into the plastic article has a heat deflection temperature increase of at least 5° C. more than the heat deflection temperature of the polylactic acid alone, when both are measured at 66 pounds per square inch using the protocol of ASTM D648.

Features and advantages of the composition of the present invention will be further explained with reference to the embodiments and the examples showing the unexpected results as seen in the Drawing.

EMBODIMENTS OF THE INVENTION

Polylactic Acid

Figure 1:
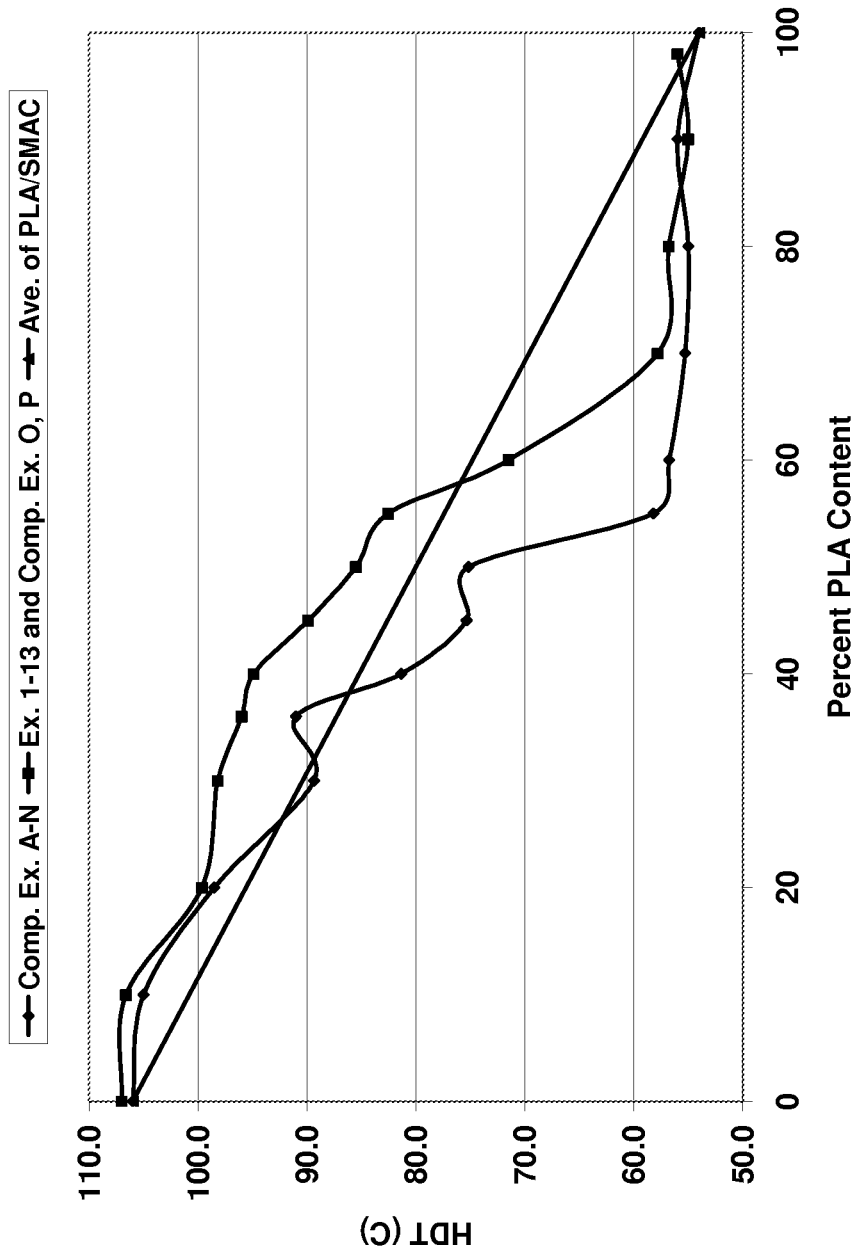
FIG. 1 is a table comparing HDT results between comparative examples without oligomeric chain extender and examples with oligomeric chain extender.

PLA is a well-known biopolymer, having the following monomeric repeating group:

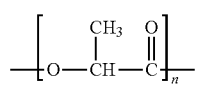

The PLA can be either poly-D-lactide, poly-L-lactide, or a combination of both. PLA is commercially available from NatureWorks, LLC located in all manufacturing regions of the world. Any grade of PLA is a candidate for use in the present invention. The number average molecular weight of PLA can be any which is currently available in a commercial grade or one which is brought to market in the future. To the extent that a current end use of a plastic article could benefit from being made from PLA and from having the heat resistance of the composition of the present invention, then that suitable PLA should be the starting point for constructing the composition of the present invention.

Styrene Maleic Anhydride Copolymer

SMAC is a copolymer having the following co-monomeric repeating group:

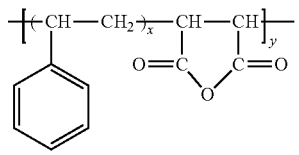

Candidates of SMAC for the present invention can be based on a combination of two different factors: percentage maleic anhydride content and molecular weight.

One set of candidates relies on a low molar ratio of styrenic moiety to maleic anhydride moiety and a low molecular weight of SMAC. This set of candidate SMACs can have a molar ratio of styrenic moiety to maleic anhydride moiety ranging from about 4:1 to about 1:1, and preferably about 1:1. Likewise, such candidates should have a number average molecular weight ranging from about 1000 to about 1,000,000, and preferably from about 2000 to about 200,000. Most preferably, the SMAC has a number average molecular weight of 2000.

SMAC of this first set of candidates is commercially available in a number of grades under the SMA® brand of SMAC from Sartomer Company of Exton, Pa., USA. Of them, SMA® 1000 is preferred.

The second set of candidates relies on a high molar ratio of styrenic moiety to maleic anhydride moiety and a high molecular weight of SMAC. This set of candidate SMACs can have a molar ratio of styrenic moiety to maleic anhydride moiety ranging from about 20:1 to about 5:1, and preferably about 10:1. Likewise, such candidates should have a number average molecular weight ranging from about 75,000 to about 250,000, and preferably from about 100,000 to about 200,000. Most preferably, the SMAC has a number average molecular weight of 150,000.

SMAC of this second set of candidates has been commercially available in a number of grades under the Dylark® brand of SMAC from Nova Chemicals of Pittsburgh, Pa., USA and may become commercially available again soon. Of them, Dylark® FG7300 and FG2500 are preferred. Another source is from Polyscope Polymers BV of Roermond, the Netherlands bearing the Xiran® brand in a number of grades with Mn of 80,000-180,000 and a styrenic/maleic anhydride moiety ratio range of 4.54:1-2.94:1. Presently, Xiran SZ22110 and Xiran SZ26080 grades are preferred.

Presently, there is no set of commercially available SMAC candidates which have both a high molecular weight SMAC and a low styrenic/maleic anhydride moiety ratio. If there were, that set of candidates could also be useful.

Oligomeric Chain Extender

What sets the compositions of this invention apart from merely blended mixtures of PLA and SMAC is the addition of an oligomeric chain extender.

The oligomeric chain extender useful for forming the composition, as defined above, is an epoxy functional low molecular weight styrene-acrylate copolymer such as those disclosed in U.S. Pat. No. 6,605,681 (Villalobos et al.) and U.S. Pat. No. 6,984,694 (Blasius et al.), incorporated by reference herein.

Stated another way, the oligomeric chain extender is the polymerization product of (i) at least one epoxy-functional (meth)acrylic monomer; and (ii) at least one styrenic and/or (meth)acrylic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000. Preferably, the oligomeric chain extender a polydispersity index of from about 1.5 to about 5.

Of possible candidates of epoxy-functional styrene-acrylate chain extenders, Joncryl® brand chain extender oligomers are preferred, commercially available from BASF (formerly Johnson Polymers) of Milwaukee, Wis. Various grades available and useful are ADR-4300, ADR-4370 and ADR-4368, all of which are solids. Alternatively, one can use liquid grades, namely: ADR-4380, ADR-4385, and ADR-4318.

It has been found that the addition of a very small amount the oligomeric chain extender facilitates a reaction between the PLA and the SMAC. A new composition is formed which has the benefits of the bio-derived PLA resin and the heat resistance performance of the SMAC.

Optional Compatibilizer

To assist in the mixing of PLA and SMAC before reaction with the oligomeric chain extender, a compatibilizer can be used. Any dual-affinity composition or molecule with affinity for lactide moieties and either styrenic or anhydridic moieties can be a candidate for use as a compatibilizer.

Optional Impact Modifier

Any conventional impact modifier is a candidate for use in compositions of the present invention. Core/shell impact modifiers, rubbery impact modifiers, etc. are suitable.

Optional Filler

Any conventional filler is a candidate for use in compositions of the present invention. Fillers increase mass without adversely affecting the physical properties of the composition. A precipitated calcium carbonate marketed under the Emforce® from Specialty Minerals, a business unit of Mineral Technologies, Inc. of New York City can be useful in the present invention.

Other Optional Additives

The compositions of the present invention can include other conventional plastics additives in an amount that is sufficient to obtain a desired processing or performance property for the composition. The amount should not be wasteful of the additive nor detrimental to the processing or performance of the composition. Those skilled in the art of thermoplastics compounding, without undue experimentation but with reference to such treatises as *Plastics Additives Database* (2004) from Plastics Design Library (www.williamandrew.com), can select from many different types of additives for inclusion into the compositions of the present invention.

Non-limiting examples of optional additives include adhesion promoters; biocides (antibacterials, fungicides, and mildewcides), anti-fogging agents; anti-static agents; bonding, blowing and foaming agents; dispersants; fire and flame retardants and smoke suppressants; initiators; lubricants; pigments, colorants and dyes; plasticizers; processing aids; release agents; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire composition.

TABLE 1

|  | Acceptable | Desirable | Preferable |
|---|---|---|---|
| Composition | | | |
| PLA | 30-80 | 35-75 | 50-70 |
| SMAC | 20-70 | 25-65 | 30-50 |
| Epoxy Functional Styrene-Acrylate Oligomeric Chain Extender | 0.25-5 | 0.5-3 | 0.5-2 |
| Additives | | | |
| Optional Compatibilizer | 0-20 | 5-20 | 5-15 |
| Optional Impact Modifier | 0-20 | 5-20 | 5-15 |
| Optional Filler | 0-50 | 0-40 | 0-30 |
| Other Optional Additives | 0-10 | 0-10 | 0-10 |

Processing

The preparation of compositions of the present invention is uncomplicated and can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 700 revolutions per minute (rpm), and preferably from about 100 to about 300 rpm. Typically, the output from the extruder is pelletized for later shaping by extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later shaping by extrusion or molding into polymeric articles.

During continuous or batch processing, the oligomeric chain extender reacts with the PLA, the SMAC, or both to form the composition of the present invention.

Optionally but preferably, prior to batch or continuous melt-mixing, one can dry the ingredients to help reduce the possibility of a moisture-activated degradation or reaction in the melt-mixing vessel. Alternatively, one can use other ways to reduce degradation possibilities, such as incorporating a moisture scavenger or desiccant into the formulation, applying a vacuum within the melt-mixing vessel, etc. Any of these techniques, or combination of techniques, results in the ingredients being dried before or during melt-mixing.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compositions of the present invention.

Regardless of drying or other techniques during melt-mixing, it has been found that drying the composition before molding can have a direct effect on performance properties, including heat deflection temperature. As the Examples below demonstrate, the amount of drying should be much closer to about 48 hours than about 4 hours, in order to achieve an essentially dry composition prior to molding, i.e., having a moisture content of less than 0.1%. To reduce the possibility of drying at a temperature approaching the heat deflection temperature of 65° C., the temperature can be up to about 60° C. without vacuum. Indeed, without undue experimentation, one can identify the best combination of time, temperature, and atmospheric pressure to reduce the time of drying while maximizing the amount of drying, without approaching a temperature which would degrade or otherwise affect performance of the composition shaped as a molded or extruded product.

Usefulness of the Invention

Any plastic article is a candidate for use of the compositions of the present invention. With the heat durability of PLA now achieved, all types of plastic articles which required at least a 5° C. HDT differential (and preferably a HDT of at least 65° C. at 66 psi), previously made from fossil-derived polymers, can now be made from a sustainable PLA polymer composition.

Plastic articles made from compositions of the present invention can be shaped via molding or extruding for use in the transportation, appliance, electronics, building and construction, biomedical, packaging, and consumer markets.

For example, food packaging can now be made from a PLA composition of the present invention and retain sufficient heat resistance to withstand storage or transport at temperatures approaching 60° C. The plastic article made from a composition of the present invention will retain its structural integrity at least 5° C. higher than with PLA alone and preferably at temperatures below 65° C.

EXAMPLES

Comparative Examples A-BB and Examples 1-20

Table 2 shows the list of ingredients. Table 3 shows the extrusion conditions. Table 4 shows the molding conditions. Table 5 shows the recipes and the HDT of 65° C. at 66 psi according to ASTM D648.

TABLE 2

| Ingredients | | | |
|---|---|---|---|
| Name | Brand | Composition | Manufacturer |
| PLA | Ingeo ™ 4042D | Polylactide Resin | NatureWorks LLC |
| SMAC 1 | Dylark ® FG2500 | Styrene Maleic Anhydride resin | Nova Chemicals |

TABLE 2-continued

Ingredients

| Name | Brand | Composition | Manufacturer |
|---|---|---|---|
| SMAC 2 | Dylark ® FG7300 | Styrene Maleic Anhydride resin | Nova Chemicals |
| Oligomer | Joncryl ® ADR-4368 | Epoxy-Functional Styrene-Acrylate Oligomer | BASF |
| TiO₂ | Tioxide R-FC6 | Titanium Dioxide | Huntsman |
| Stabilizer | Irganox B225 | Phenolic/Phosphite Stabilizer Blend | BASF, fka Ciba |

TABLE 3

Extruder Conditions

| Pre-Extruder Drying | PLA resin was dried at 80° C. for 8 hours prior to extrusion |
|---|---|
| Extruder Type | Prism 16 mm Counter-Rotating Twin Screw Extruder |
| Order of Addition | All ingredients mixed together and fed into the extruder hopper. |
| All Zones and Die (° C.) | 220 |
| RPM | 250 |

TABLE 4

Molding Conditions
88 ton Nissei molding machine

Drying Conditions before Molding:

| Temperature (° C.) | 60 |
|---|---|
| Time (h) | 10-12 |

Temperatures:

| Nozzle (° F.) | 425 |
|---|---|
| Zone 1 (° F.) | 415 |
| Zone 2 (° F.) | 410 |
| Zone 3 (° F.) | 410 |
| Mold (° F.) | 120-150 |
| Oil Temp (° F.) | 80-85 |

Speeds:

| Screw RPM (%) | 65 (LV) |
|---|---|
| % Shot - Inj Vel Stg 1 | 50 |
| % Shot - Inj Vel Stg 2 | 40 |
| % Shot - Inj Vel Stg 3 | 30 |
| % Shot - Inj Vel Stg 4 | 20 |
| % Shot - Inj Vel Stg 5 | 10 |

Pressures:

| Hold Stg 1 (PSI) - | 500 |
|---|---|
| Time (sec) | 5 |
| Hold Stg 2 (PSI) - | 400 |
| Time (sec) | 5 |

Timers:

| Injection Hold (sec) | 7 |
|---|---|
| Cooling Time (sec) | 30 |

Operation Settings:

| Shot Size (mm) | 58 |
|---|---|
| Cushion (mm) | 1.4-1.6 |

TABLE 5

Recipes in Weight Percent and HDT Results

| Example | PLA % | SMAC % | TiO₂ % | Stabilizer % | Oligomer % | HDT ° C. |
|---|---|---|---|---|---|---|
| SMAC 1 - Dylark ® FG2500 SMAC resin | | | | | | |
| A | 0 | 100 | 0 | 0 | 0 | 106.0 |
| B | 10 | 89.3 | 0.5 | 0.2 | 0 | 105.0 |
| C | 20 | 79.3 | 0.5 | 0.2 | 0 | 98.5 |
| D | 30 | 69.3 | 0.5 | 0.2 | 0 | 89.4 |
| E | 36 | 63.3 | 0.5 | 0.2 | 0 | 91.0 |
| F | 40 | 59.3 | 0.5 | 0.2 | 0 | 81.4 |
| G | 45 | 54.3 | 0.5 | 0.2 | 0 | 75.4 |
| H | 50 | 49.3 | 0.5 | 0.2 | 0 | 75.2 |
| I | 55 | 44.3 | 0.5 | 0.2 | 0 | 58.2 |
| J | 60 | 39.3 | 0.5 | 0.2 | 0 | 56.8 |
| K | 70 | 29.3 | 0.5 | 0.2 | 0 | 55.3 |
| L | 80 | 19.3 | 0.5 | 0.2 | 0 | 55.0 |
| M | 90 | 9.3 | 0.5 | 0.2 | 0 | 56.0 |
| N | 100 | 0 | 0 | 0 | 0 | 54.0 |
| O | 0 | 99.5 | 0 | 0 | 0.5 | 107.0 |
| 1 | 10 | 88.8 | 0.5 | 0.2 | 0.5 | 106.6 |
| 2 | 20 | 78.8 | 0.5 | 0.2 | 0.5 | 99.7 |
| 3 | 30 | 68.8 | 0.5 | 0.2 | 0.5 | 98.2 |
| 4 | 36 | 62.8 | 0.5 | 0.2 | 0.5 | 96.0 |
| 5 | 40 | 58.8 | 0.5 | 0.2 | 0.5 | 94.9 |
| 6 | 45 | 53.8 | 0.5 | 0.2 | 0.5 | 89.9 |
| 7 | 50 | 48.8 | 0.5 | 0.2 | 0.5 | 85.5 |
| 8 | 55 | 43.8 | 0.5 | 0.2 | 0.5 | 82.6 |
| 9 | 60 | 38.8 | 0.5 | 0.2 | 0.5 | 71.5 |
| 10 | 70 | 28.8 | 0.5 | 0.2 | 0.5 | 57.8 |
| 11 | 80 | 18.8 | 0.5 | 0.2 | 0.5 | 56.8 |
| 12 | 90 | 8.8 | 0.5 | 0.2 | 0.5 | 55.0 |
| P | 98 | 0 | 0 | 0 | 2.0 | 56.0 |
| SMAC 2 -- Dylark ® FG7300 SMAC resin | | | | | | |
| Q | 0 | 100 | 0 | 0 | 0 | 118.0 |
| R | 30 | 69.3 | 0.5 | 0.2 | 0 | 110.3 |
| S | 40 | 59.3 | 0.5 | 0.2 | 0 | 93.6 |
| T | 45 | 54.3 | 0.5 | 0.2 | 0 | 78.8 |
| U | 50 | 49.3 | 0.5 | 0.2 | 0 | 69.0 |
| V | 55 | 44.3 | 0.5 | 0.2 | 0 | 58.6 |
| W | 60 | 39.3 | 0.5 | 0.2 | 0 | 60.0 |
| X | 65 | 34.3 | 0.5 | 0.2 | 0 | 59.8 |
| Y | 70 | 29.3 | 0.5 | 0.2 | 0 | 57.8 |
| Z | 100 | 0 | 0 | 0 | 0 | 54.0 |
| AA | 0 | 99.5 | 0 | 0 | 0.5 | 118.0 |
| 13 | 30 | 68.8 | 0.5 | 0.2 | 0.5 | 111.9 |
| 14 | 40 | 58.8 | 0.5 | 0.2 | 0.5 | 110.0 |
| 15 | 45 | 53.8 | 0.5 | 0.2 | 0.5 | 106.5 |
| 16 | 50 | 48.8 | 0.5 | 0.2 | 0.5 | 105.1 |
| 17 | 55 | 43.8 | 0.5 | 0.2 | 0.5 | 102.0 |
| 18 | 60 | 38.8 | 0.5 | 0.2 | 0.5 | 100.4 |
| 19 | 65 | 33.8 | 0.5 | 0.2 | 0.5 | 94.3 |
| 20 | 70 | 28.8 | 0.5 | 0.2 | 0.5 | 58.5 |
| BB | 98 | 0 | 0 | 0 | 2.0 | 56.0 |

FIG. 1 shows a comparison of Comparative Examples A-N with Comparative Examples O and P with Examples 1-13. Between about 20 wt. % PLA and about 70 wt. % PLA, adding a mere 0.5 wt. % of oligomeric chain extender significantly improved the HDT performance of the composition. Moreover, between about 1 wt. % and about 60 wt. %, adding that oligomeric chain extender caused the composition to outperform what could have been predicted by the HDT of pure PLA and the HDT of pure SMAC. The SMAC used already contained impact modifier.

Figure 2:
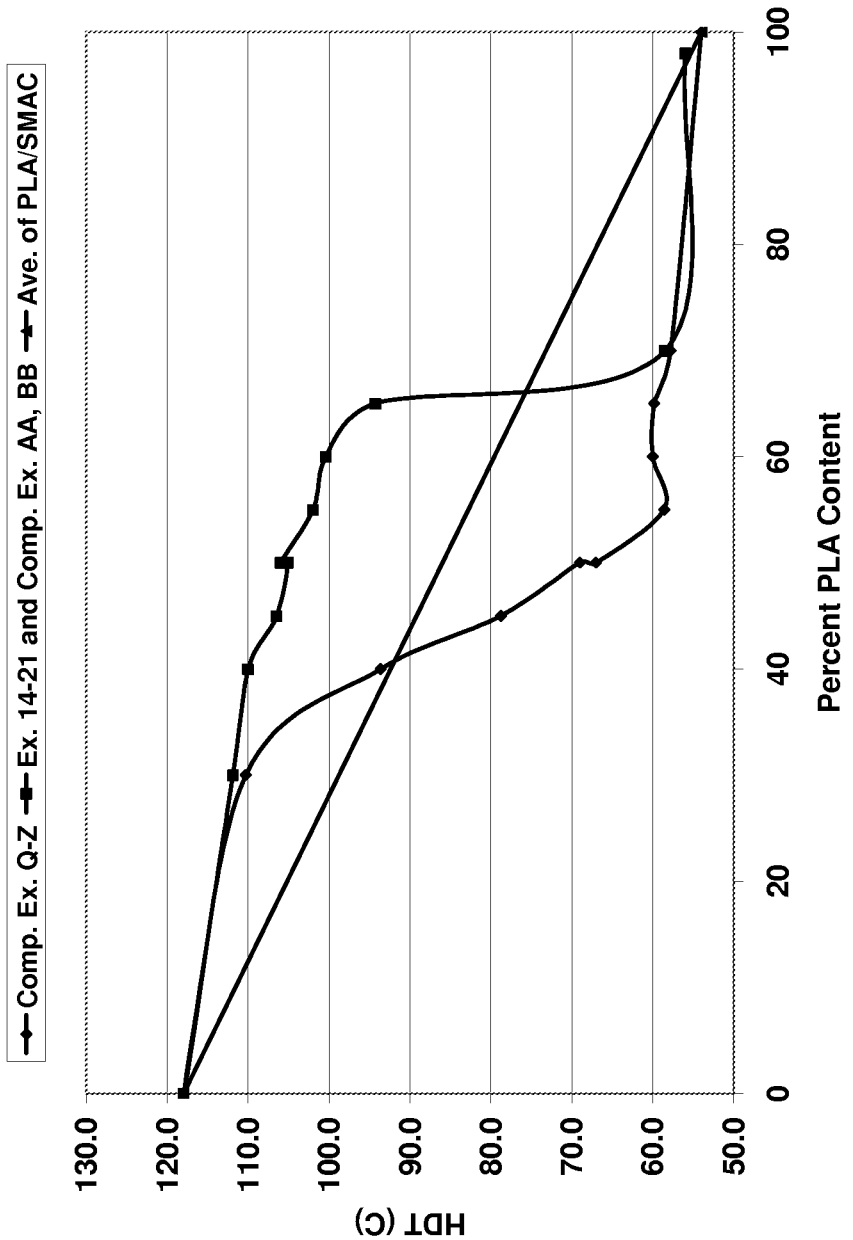
FIG. 2 is another table comparing HDT results between comparative examples without oligomeric chain extender and examples with oligomeric chain extender.

FIG. 2 shows use of a SMAC without impact modifier involving the same experiment as seen in FIG. 1. Comparative Examples Q-Z with Comparative Examples AA and BB with Examples 14-21. Between about 30 wt. % PLA and about 70 wt. % PLA, adding a mere 0.5 wt. % of oligomeric chain extender significantly improved the HDT performance of the composition. Moreover, between about 1 wt. % and about 65 wt. %, adding that oligomeric chain extender caused the composition to outperform what could have been predicted by the HDT of pure PLA and the HDT of pure SMAC.

Table 6 shows the numerical comparison results depicted in FIGS. 1 and 2, of direct comparison of percentage PLA content and the HDT of Comparative Examples and Examples without and with oligomer, respectively.

TABLE 6

Comparisons

| Wt. % PLA | PLA:SMAC Ratio* | Comp. Ex. - Ex. | Delta HDT ° C. | % Delta HDT |
|---|---|---|---|---|
| 10 | 0.1 | 1-B | 1.6 | 2% |
| 20 | 0.3 | 2-C | 1.2 | 1% |
| 30 | 0.4 | 3-D | 8.8 | 10% |
| 36 | 0.6 | 4-E | 5.0 | 5% |
| 40 | 0.7 | 5-F | 13.6 | 17% |
| 45 | 0.8 | 6-G | 14.6 | 19% |
| 50 | 1.0 | 7-H | 10.4 | 14% |
| 55 | 1.3 | 8-I | 24.4 | 42% |
| 60 | 1.5 | 9-J | 14.8 | 26% |
| 70 | 2.4 | 10-K | 2.5 | 5% |
| 80 | 4.3 | 11-L | 1.8 | 3% |
| 90 | 10.2 | 12-M | −1.0 | −2% |
| 30 | 0.4 | 13-R | 1.6 | 1% |
| 40 | 0.7 | 14-S | 16.4 | 18% |
| 45 | 0.8 | 15-T | 27.7 | 35% |
| 50 | 1.0 | 16-U | 36.1 | 52% |
| 55 | 1.3 | 17-V | 43.4 | 74% |
| 60 | 1.5 | 18-W | 40.4 | 67% |
| 65 | 1.9 | 19-X | 34.5 | 58% |
| 70 | 2.4 | 20-Y | 0.7 | 1% |

*Ratio in Examples 1-20

Both in terms of absolute differential and percentage differential, the addition of as little as 0.5 weight percent caused a truly unexpected improvement in HDT, all other variables being held constant.

Also using a weight ratio of PLA:SMAC in the composition of 2.3:1.0 or less, preferably in the range of 1.9:1.0-0.4:1.0, results is superior HDT performance.

Comparative Example U and Example 17 were repeated, substituting the Dylark® FG7300 SMAC with Xiran® SZ26080 SMAC from Polyscope, and essentially the same unexpected results were obtained.

The invention is not limited to the above embodiments. The claims follow.

What is claimed is:

1. A heat resistant polylactic acid composition, comprising:
   (a) polylactic acid;
   (b) styrene maleic anhydride copolymer;
   (c) an epoxy functional styrene-acrylate oligomeric chain extender;
   wherein polylactic acid and styrene maleic anhydride copolymer have a weight ratio of 2.3:1.0 or less;
   wherein if the composition is essentially dried before shaping into a plastic article, then the composition after shaping into the plastic article has a heat deflection temperature increase of at least 5° C. more than the heat deflection temperature of the polylactic acid alone, when both are measured at 66 pounds per square inch using the protocol of ASTM D648.

2. The composition of claim 1, wherein if the composition is essentially dried before shaping into a plastic article, then the composition after shaping into the plastic article has a heat deflection temperature of at least 65° C. at 66 pounds per square inch using the protocol of ASTM D648.

3. The composition of claim 1, further comprising a compatibilizer of a poly (meth)acrylate.

4. The composition of claim 1, wherein the polylactic acid and the styrene maleic anhydride copolymer are dried before or during being melt-mixed together.

5. The composition of claim 1, further comprising an impact modifier.

6. The composition of claim 1, further comprising titanium dioxide.

7. The composition of claim 1, wherein the amount of styrene maleic anhydride copolymer ranges from about 7 to about 54 weight percent of the total composition and wherein polylactic acid and styrene maleic anhydride copolymer have a weight ratio ranging from 1.9:1.0 to 0.4:1.0.

8. The composition of claim 3, wherein the amount of styrene maleic anhydride copolymer ranges from about 7 to about 54 weight percent of the total composition and wherein polylactic acid and styrene maleic anhydride copolymer have a weight ratio of 1.9:1.0 to 0.4:1.0.

9. The composition of claim 1, wherein the polylactic acid is a significant component.

10. The composition of claim 3, wherein the polylactic acid is a significant component.

11. A plastic article shaped from a composition of claim 1.

12. The article of claim 11, wherein the article is molded or extruded and wherein the article is shaped for use in transportation, appliance, electronics, building and construction, packaging, or consumer markets.

13. A plastic article shaped from a composition of claim 3, wherein the plastic article has a heat deflection temperature increase of at least 5° C. more than the heat deflection temperature of a plastic article made of polylactic acid alone, when both are measured at 66 pounds per square inch using the protocol of ASTM D648.

14. The article of claim 13, wherein the article is molded or extruded and wherein the article is shaped for use in transportation, appliance, electronics, building and construction, packaging, or consumer markets.

15. A method of making the composition of claim 1, comprising the steps of
   (a) gathering ingredients including polylactic acid and styrene maleic anhydride copolymer and an epoxy functional styrene-acrylate oligomeric chain extender, and
   (b) mixing them into a composition.

16. The method of making the composition of claim 15, further comprising the steps of
   (c) drying the composition to a moisture content of less than 0.1% and
   (d) shaping the composition into a plastic article for use in transportation, appliance, electronics, building and construction, packaging, or consumer markets.

17. The method of claim 15, wherein the mixing step (b) causes a reaction between the polylactic acid and the epoxy functional styrene-acrylate oligomeric chain extender, a reaction between the styrene maleic anhydride copolymer and the epoxy functional styrene-acrylate oligomeric chain extender, or a reaction among the polylactic acid, the styrene maleic anhydride copolymer and the epoxy functional styrene-acrylate oligomeric chain extender.

* * * * *